(12) United States Patent
Kim

(10) Patent No.: US 9,355,158 B2
(45) Date of Patent: May 31, 2016

(54) MODIFYING SEARCH RESULTS BASED ON SELECTION OF ONE OF THE SEARCH RESULTS

(71) Applicant: Google Inc., Mountain View, CA (US)

(72) Inventor: Hyunchan Kim, Guri (KR)

(73) Assignee: Google Inc., Mountain View, CA (US)

( * ) Notice: Subject to any disclaimer, the term of this patent is extended or adjusted under 35 U.S.C. 154(b) by 337 days.

(21) Appl. No.: 14/013,709

(22) Filed: Aug. 29, 2013

(65) Prior Publication Data

US 2015/0066902 A1 Mar. 5, 2015

(51) Int. Cl.
*G06F 17/30* (2006.01)

(52) U.S. Cl.
CPC .... *G06F 17/30554* (2013.01); *G06F 17/30864* (2013.01)

(58) Field of Classification Search
None
See application file for complete search history.

(56) References Cited

U.S. PATENT DOCUMENTS

| 5,960,422 A | 9/1999 | Prasad |
| 8,051,076 B1 | 11/2011 | Garg et al. |
| 2004/0254932 A1 | 12/2004 | Gupta et al. |
| 2008/0140657 A1 | 6/2008 | Azvine et al. |
| 2010/0082610 A1 | 4/2010 | Anick et al. |
| 2011/0208712 A1 | 8/2011 | Jones et al. |
| 2012/0331420 A1 | 12/2012 | Meyer et al. |
| 2013/0124555 A1* | 5/2013 | Duquene .......... G06F 17/30873 707/769 |
| 2015/0310104 A1* | 10/2015 | Marchisio ......... G06F 17/30731 707/722 |

FOREIGN PATENT DOCUMENTS

WO WO2004031991 4/2004

OTHER PUBLICATIONS

International Search Report and Written Opinion of PCT Serial No. PCT/US14/053198 Dec. 4, 2014.

* cited by examiner

*Primary Examiner* — Bai D. Vu
(74) *Attorney, Agent, or Firm* — Middleton Reutlinger

(57) ABSTRACT

Methods and apparatus for modifying search results based selection of one of the search results by a user to whom the search results are presented. Initially provided search results may include at least a first set of search results that are associated with a first entity and a second set of search results that are associated with a second entity. In response to a user selection of one of the search results of the first set, the initial search results may be modified to demote and/or omit those search results of the second set that are not also of the first set. The user may be provided with the modified search results.

19 Claims, 10 Drawing Sheets

| Search Result | Entity | Set |
|---|---|---|
| S1 | A | 1 |
| S2 | A | 1 |
| S3 | B | 2 |
| S4 | B | 2 |
| S5 | C | 3 |
| S6 | D | 4 |
| S7 | C | 3 |
| S8 | ? | 5 |
| S9 | A | 1 |
| S10 | B | 2 |

FIG. 4A

| Search Result | Entity | Set |
|---|---|---|
| S11 | A | 1 |
| S12 | A, B | 1, 2 |
| S13 | B | 2 |
| S14 | B | 2 |
| S15 | A | 1 |
| S16 | C | 3 |
| S17 | D | 4 |
| S18 | A, B | 1, 2 |
| S19 | C | 3 |
| S20 | D | 4 |

FIG. 4B

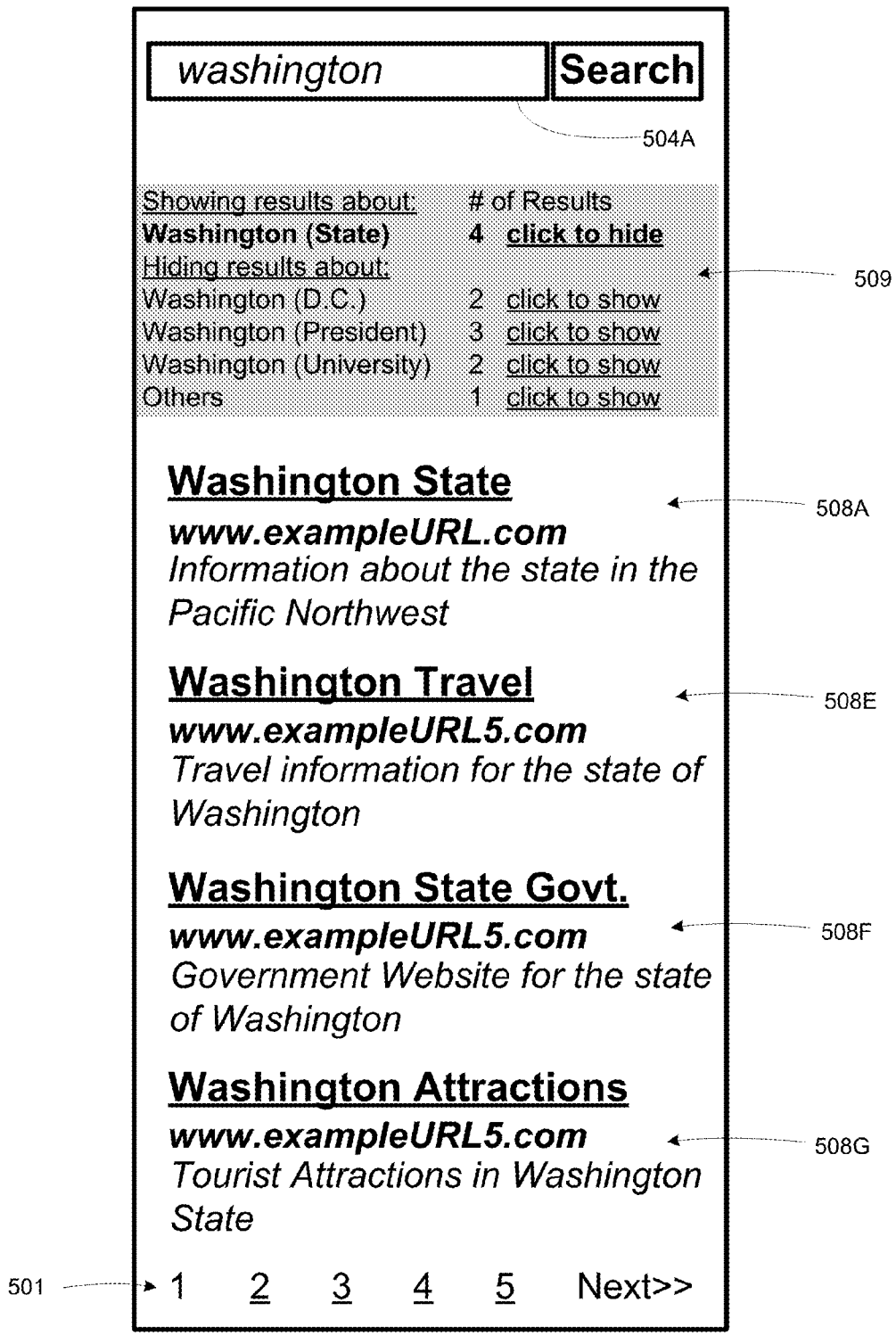
FIG. 5C1

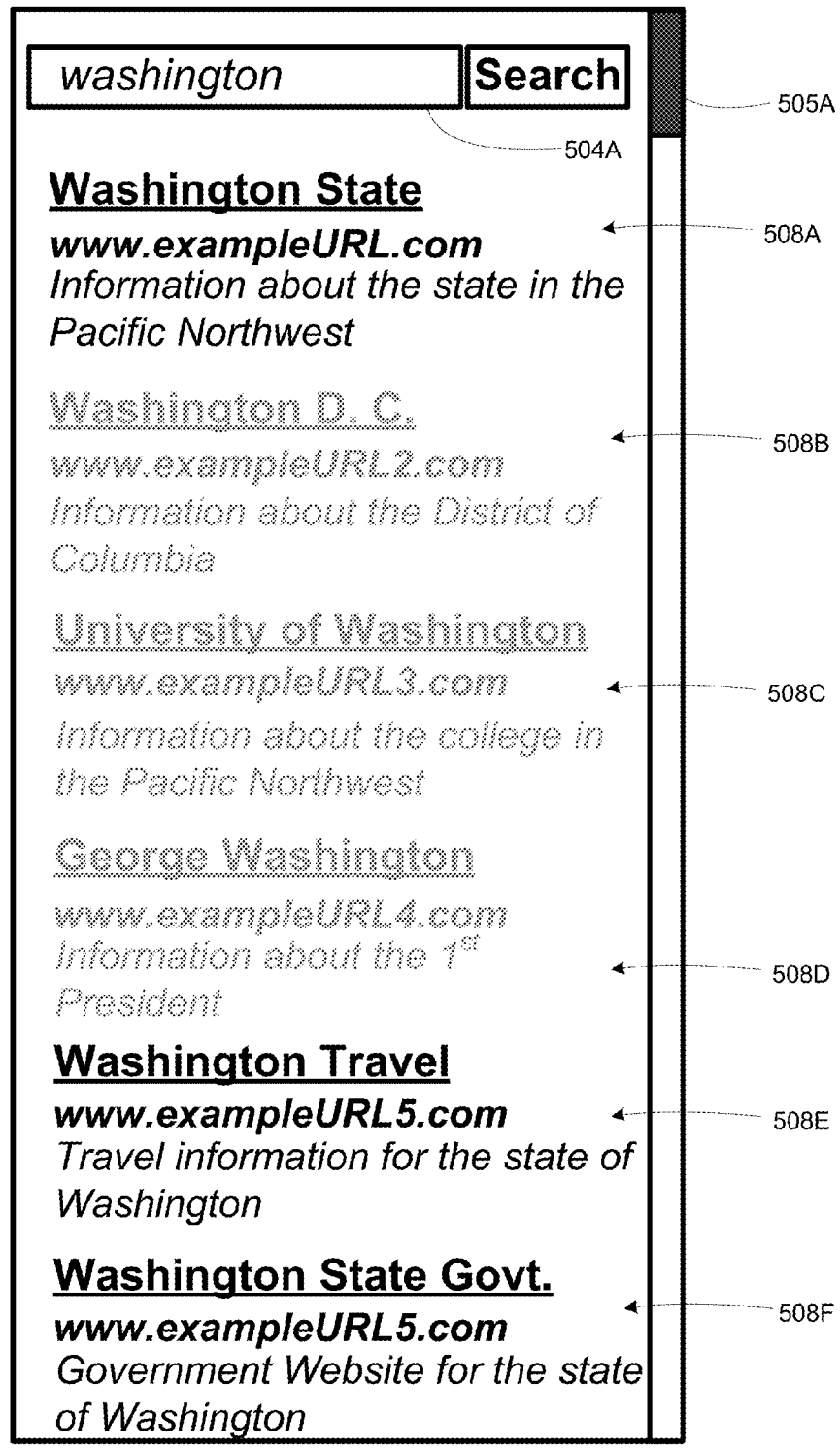
FIG. 5C2

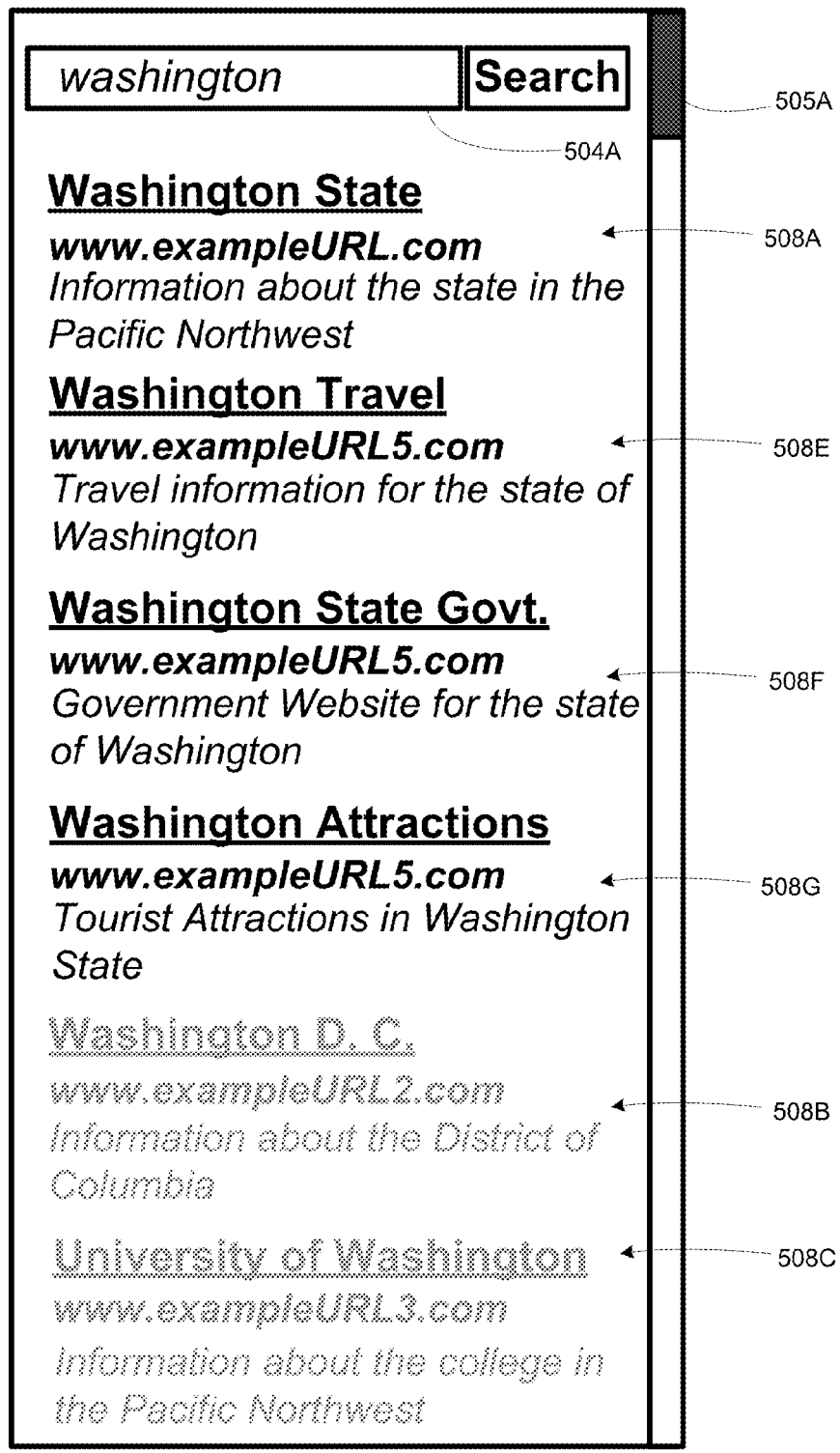
FIG. 5C3

MODIFYING SEARCH RESULTS BASED ON SELECTION OF ONE OF THE SEARCH RESULTS

BACKGROUND

Internet search engines provide information about Internet accessible documents such as web pages, images, text documents, and/or multimedia content. A search engine may identify the documents in response to a user's search query that includes one or more search terms. The search engine ranks the documents based on the relevance of the documents to the query and the importance of the documents and provides search results that include aspects of and/or links to the identified documents.

SUMMARY

This specification is directed generally to modifying search results, and, more particularly, to modifying search results based on selection of one of the search results by a user to whom the search results are presented. Initially provided search results may include at least a first set of search results that are associated with a first entity and a second set of search results that are associated with a second entity. In response to a user selection of one of the search results of the first set, the search results may be modified to demote and/or omit those search results of the second set that are not also of the first set. For example, an initial display of search results for a search query of "penguins" may include a first set of search results that are associated with the bird penguin, a second set of search results that are associated with the ice hockey team the Pittsburgh Penguins, and a third set of search results that are associated with the publishing group Penguin Group. In response to a user selection of a search result associated with the bird penguin, the initial display of search results may be modified to create a modified display of search results that omit those search results that are associated with the ice hockey team the Pittsburgh Penguins and that omit those search results that are associated with the publishing group Penguin Group. For example, the user may select a search result associated with the bird penguin from a search results webpage providing initial search results and navigate to a document associated with the search result in response to the selection. The user may be provided with the modified display of search results when the user navigates back to the search results webpage.

In some implementations a computer implemented method may be provided that includes the steps of: providing initial search results that are responsive to a search query, the initial search results including a first set of search results that are each associated with a first entity and a second set of search results that are each associated with a second entity, wherein the first entity is distinct from the second entity, and wherein the first set of search results include one or more search results that are distinct from one or more of the search results of the second set of search results; determining a selection of a first search result of the first set of search results, the selection of the first search result indicative of retrieval of a first document linked to by the first search result; and modifying, based on the selection of the first search result, the initial search results to create modified search results, wherein modifying the initial search results includes maintaining multiple search results of the first set of search results and omitting or demoting the search results of the second set of search results that are not of the first set of search results.

This method and other implementations of technology disclosed herein may each optionally include one or more of the following features.

The method may further include providing the modified search results in response to the selection of the first search result.

Modifying the initial search results may include maintaining only search results of the first set of search results in the modified search results.

Demoting the search results of the second set of search results that are not of the first set of search results may include demoting, in the modified search results, the presentation position of the second set of search results that are not of the first set of search results.

Demoting the second set of search results that are not of the first set of search results may include altering, in the modified search results, at least one display parameter of the search results of the second set of search results that are not of the first set of search results. Altering the display parameter may include increasing an amount of dimming.

The initial search results may be provided as a search results webpage and the selection of the first search result may include navigation to the first document from the search results webpage. The first document may be associated with a first uniform resource locator having a first second-level domain name and the search results webpage may be associated with a second uniform resource locator having a second second-level domain name distinct from the first second-level domain name. The method may further include providing the modified search results in a navigation back to the search results webpage after the navigation to the first document from the search results webpage. The navigation to the first document may include navigation to the first document in a first display of a browser while maintaining the search results webpage in a second display of the browser and the navigation back to the search results webpage may include viewing of the second display after viewing of the first display. Modifying the initial search results may include generating a modified search results webpage to supplant the search results webpage. Modifying the initial search results may include modifying one or more presentation parameters of the search results webpage to provide the modified search results.

The method may further include: receiving the search query; identifying the initial search results that are responsive to the search query; identifying, for each search result of the initial search results, one or more entities associated with the search result; determining one or more of the initial search results to include in the first set of search results based on association with the first entity of the entities; and determining one or more of the initial search results to include in the second set of search results based on association with the second entity of the entities, wherein providing the initial search results includes providing the initial search results to a client device.

The search results of the first set of search results may all be distinct from the search results of the second set of search results.

Providing the initial search results that are responsive to the query may include providing the initial search results to a client device to present the initial search results to a user.

Providing the initial search results that are responsive to the query may include presenting the initial search results to a user.

In some implementations a computer implemented method may be provided that includes the steps of: receiving a search query submitted by a client device; identifying a plurality of search results that are responsive to the search query; identifying, for each search result of the search results, one or more representative entities associated with the search result; determining a first set of search results of one or more of the search results that are each associated with a first entity set of one or more of the representative entities; determining a second set of search results of one or more of the search results that are each associated with a second entity set of one or more of the representative entities, wherein the second entity set is distinct from the first entity set, and wherein one or more of the search results of the first set of search results are distinct from one or more of the search results of the second set of search results; providing initial search results to the client device that are responsive to the search query, the initial search results including the first set of search results and including the second set of search results; providing modification instructions to modify the initial search results based on user selection of one of the initial search results, the modification instructions including instructions to: determine a selection of a given search result of any of the first set of search results, the selection indicative of navigation, by the computing device, to a given document linked to by the given search result, and determine, based on the selection of the given search result, modified search results that include the first set of search results and that omit or demote the search results of the second set of search results that are not members of the first set of search results.

This method and other implementations of technology disclosed herein may each optionally include one or more of the following features.

The modification instructions may include instructions to include only the first set of search results in the modified search results.

The modification instructions may include instructions to omit the search results of the second set of search results that are not of the first set of search results.

The modification instructions may include instructions to demote the presentation position of the search results of the second set of search results that are not of the first set of search results.

The modification instructions may include instructions to demote the search results of the second set of search results that are not of the first set of search results by altering at least one display parameter of the search results of the second set of search results that are not of the first set of search results.

The search results may be provided to the computing device as a search results webpage and providing the modification instructions may include providing the modification instructions to the client device for execution at least in part by the client device. Providing the modification instructions to the client device for execution at least in part by the client device may include embedding a link to the modification instructions in the search results webpage.

Providing the modification instructions may include providing the modification instructions to the client device for execution at least in part by the computing device.

The method may further include: receiving selection input indicative of the selection; executing the modification instructions to determine the modified search results; and providing the modified search results to the client device.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

Particular implementations of the subject matter described herein modify search results that are responsive to a search query. The search results are modified based on a selection of one of the search results. Such modification of the search results represents a new aspect of the search results that may be based on the user selection of one of the search results. The modified search results may be utilized by one or more applications, such as a browser and/or a search system, to provide filtered search results to a user of the application in response to selection of one of the search results. The filtered search results may better represent the user's informational desires in issuing the search query.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4A is an example table utilized in describing an example method of determining sets of search results based on entities associated with the search results.

FIG. 4B is an example table utilized in describing an additional example method of determining sets of search results based on entities associated with the search results.

FIG. 5C1 is an example graphical user interface illustrating an example of a modified display of the search results of FIG. 5A based on the user selection of a search result of FIG. 5A.

FIG. 5C2 is an example graphical user interface illustrating another example of a modified display of the search results of FIG. 5A based on the user selection of a search result of FIG. 5A.

FIG. 5C3 is an example graphical user interface illustrating another example of a modified display of the search results of FIG. 5A based on the user selection of a search result of FIG. 5A.

DETAILED DESCRIPTION

Figure 1:
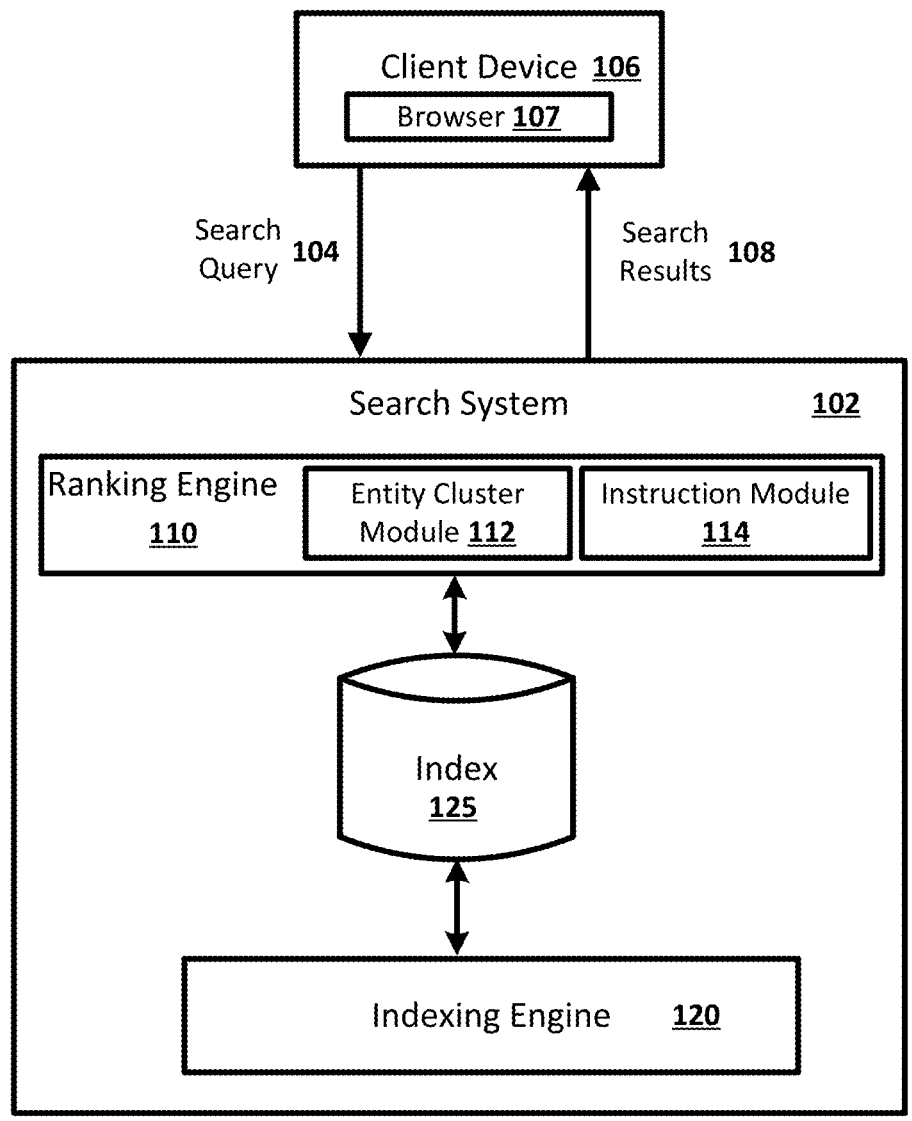
FIG. 1 illustrates an example environment in which search results may be modified based on user selection of one of the search results.

FIG. 1 illustrates an example environment in which search results may be modified based on user selection of one of the search results. As referred to herein, a "selection" of a virtual object, a search result, and/or an online resource may include, for example, a mouse-click, a click-through, a voice-based selection, a selection by a user's finger on a presence-sensitive input mechanism (e.g., a touch-screen device), and/or any other appropriate selection mechanism. The example environment includes a client device 106 and a search system 102. The search system 102 can be implemented in one or more computers that communicate, for example, through a network. The search system 102 is an example of an information retrieval system in which the systems, components, and techniques described herein may be implemented and/or with which systems, components, and techniques described herein may interface.

A user may interact with the search system 102 via the client device 106. The search system 102 receives search queries 104 from the client device 106 and returns search results 108 in response to the search queries 104. Each search query 104 is a request for information. The search query 104 can be, for example, in a text form and/or in other forms such as, for example, audio form and/or image form. Other computer devices may submit search queries to the search system 102 such as additional client devices and/or one or more servers implementing a service for a website that has partnered with the provider of the search system 102. For brevity, however, the examples are described in the context of the client device 106.

The client device 106 may be a computer coupled to the search system 102 through a network such as a local area network (LAN) or wide area network (WAN) such as the Internet. The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. The client device 106 typically includes one or more applications to facilitate submission of search queries and the sending and receiving of data over a network. For example, the client device 106 may execute one or more applications, such as a browser 107, that allow users to formulate queries and submit the queries to the search system 102.

As described herein, in some implementations the client device 106 may execute one or more applications, such as the browser 107, that execute instructions provided by the search system 102 to modify search results based on a selection of one of the search results. The client device 106 and the search system 102 each include memory for storage of data and software applications, a processor for accessing data and executing applications, and components that facilitate communication over a network. The operations performed by the client device 106 and/or the search system 102 may be distributed across multiple computer systems. The search system 102 may be implemented as, for example, computer programs running on one or more computers in one or more locations that are coupled to each other through a network.

The search system 102 includes an indexing engine 120 and a ranking engine 110. The indexing engine 120 maintains an index 125 for use by the search system 102. The indexing engine 120 processes documents and updates index entries in the index 125, for example, using conventional and/or other indexing techniques. For example, the indexing engine 120 may crawl one or more resources such as the World Wide Web and index documents accessed via such crawling. Also, for example, the indexing engine 120 may receive information related to one or documents from one or more resources such as web masters controlling such documents and index the documents based on such information. A document is any data that is associated with a document address. Documents include web pages, word processing documents, portable document format (PDF) documents, images, videos, and feed sources, to name just a few. Each document may include content such as, for example: text, images, videos, sounds, embedded information (e.g., meta information and/or hyperlinks); and/or embedded instructions (e.g., ECMAScript implementations such as JavaScript).

In some implementations, the index 125 may include index entries that associate each of one or more documents with a respective one or more entities associated with the document. For example, for each of a plurality of documents, a mapping (e.g., data defining an association) between the document and one or more entities associated with the document may be identified in the index 125. In some implementations an index of documents and associated entities may be provided in an index or other database that is separate from the index 125. In some implementations entities are topics of discourse. In some implementations, entities are persons, places, concepts, and/or things that can be referred to by a text fragment (e.g., a term or phrase) and are distinguishable from one another (e.g., based on context). For example, the text "bush" on a webpage may potentially refer to multiple entities such as President George Herbert Walker Bush, President George Walker Bush, a shrub, and the rock band Bush. In some implementations an entity may be referenced by a unique entity identifier that may be used to identify the entity. In some examples in this specification, an entity may be referenced with respect to a unique entity identifier. In some other examples, the entity may be referenced with respect to one or more alias and/or other property of the entity.

In some implementations a document may only be mapped to a single entity. For example, the document may only focus on the single entity and/or the single entity may be determined to be more important to the document than one or more other entities. In some implementations a document may be mapped to multiple entities. In some of those implementations scores may be associated with the multiple entities and the scores may indicate the strength of the association of the entity to the document. For example, scores from 0 to 1 may be associated with each of the entities, with 1 being most indicative of association of the entity to the document. For example, a webpage for the ice hockey team the Pittsburgh Penguins may be associated with multiple entities such as the entity associated with the ice hockey team the Pittsburgh Penguins and the entity associated with the sport of ice hockey. A score may be associated with each of the two entities based on, for example, a determined strength of association of each of the entities to the document.

In some implementations, the association between the documents and entities may be accessible to an entity cluster module 112 in determining one or more sets of search results for a query and/or by the instruction module 114 in determining instructions to modify search results based on user selection of one of the search results. In some implementations, an association between a document and an entity may be based on presence of one or more properties of the entity in the document. For example, an association between a document and an entity may be based on an importance of one or more alias of the entity in the document. For example, appearance of an alias of an entity in important fields and/or with great frequency in a document may be indicative of association of the entity to the document. Also, for example, an association between a document and an entity may be based on presence of additional and/or alternative properties of an entity such as date of birth, place of birth, height, weight, population, geographic location(s), type of entity (e.g., person, actor, location, business, university), etc.

In some implementations an association between a document and an entity may be based on presence in the document of one or more other entities related the entity. For example, links between entities may be identified from a database such as an entity properties database. For example, the entity properties database may include spouse information for an entity and an association between a document and a person may be based on occurrence of a spouse of the person in the document. For example, if a person's alias is ambiguous, presence of an alias of the person's spouse in a document along with the person's alias may be more indicative of the person being associated with the document than if the person's alias appeared in the document without the alias of the person's spouse. Also, for example, an association between a document and an entity may be based on presence of additional and/or alternative entities associated with a given entity, such as co-workers, co-stars, similar types of businesses, etc. Additional and/or alternative factors may be utilized in associating a document with one or more entities.

In this specification, the term "database" and "index" will be used broadly to refer to any collection of data. The data of the database and/or the index does not need to be structured in any particular way and it can be stored on storage devices in one or more geographic locations. Thus, for example, the index 125 may include multiple collections of data, each of which may be organized and accessed differently. For example, a first collection of index entries may be utilized to identify documents responsive to the search query 104 and a second collection of index entries may be utilized to identify additional information related to responsive documents such as, for example, one or more entities associated with a responsive document.

The ranking engine 110 uses the index 125 to identify documents responsive to the search query 104, for example, using conventional and/or other information retrieval techniques. The ranking engine 110 calculates scores for the documents identified as responsive to the search query 104, for example, using one or more ranking signals. Each ranking signal provides information about the document itself and/or the relationship between the document and the search query 104.

In some implementations, ranking signals may include information about the search query 104 itself such as, for example, the terms of the query, an identifier of the user who submitted the query, and/or a categorization of the user who submitted the query (e.g., the geographic location from where the query was submitted, the language of the user who submitted the query, interests of the user who submitted the query, and/or a type of the client device 106 used to submit the query (e.g., mobile device, laptop, desktop)). The identification of the user can be, for example, a user name or the IP address of the client device 106. The geographic location from where the search query 104 was submitted can be, for example, a continent, a country, a state, a city, or geographic coordinates, such as latitude and longitude.

Also, for example, ranking signals may additionally and/or alternatively include information about the terms of the search query 104 such as, for example, the locations where a query term appears in the title, body, and text of anchors in a document, where a query term appears in anchors pointing to the search result, how a term is used in the document (e.g., in the title of the document, in the body of the document, or in a link in the document), the term frequency (i.e., the number of times the term appears in a corpus of documents in the same language as the query divided by the total number of terms in the corpus), and/or the document frequency (i.e., the number of documents in a corpus of documents that contain the query term divided by the total number of documents in the corpus).

Also, for example, ranking signals may additionally and/or alternatively include information about the document such as, for example, a measure of the quality of the document, a measure of the popularity of the document, the URL of the document, the geographic location where the document is hosted, when the search system 102 first added the document to the index 125, the language of the document, the length of the title of the document, and/or the length of the text of source anchors for links pointing to the document.

The ranking engine 110 then ranks the responsive documents using the scores. For example, the responsive documents are ranked based on the scores. The search system 102 uses the responsive documents ranked by the ranking engine 110 to generate search results 108. The search results 108 include search results corresponding to the documents responsive to the search query 104. For example, each of one or more search results 108 can include a title of a respective of the documents, a link to a respective of the documents, and/or a summary of content from a respective of the documents that is responsive to the search query 104. For example, the summary of content may include a particular "snippet" or section of the document that is responsive to the search query 104. Also, for example, for a search result associated with an image document, the search result may include a reduced size display of the image document, a title associated with the image document, and/or a link to the image document. Also, for example, for a search results associated with a video document, the search result may include an image from the video, a segment of the video, a title of the video, and/or a link to the video. Other examples of search results 108 include a summary of information responsive to the search query 104 and/or an answer responsive to the search query 104. The summary can be generated from documents responsive to the search query 104 and/or from other sources.

Figure 5A:
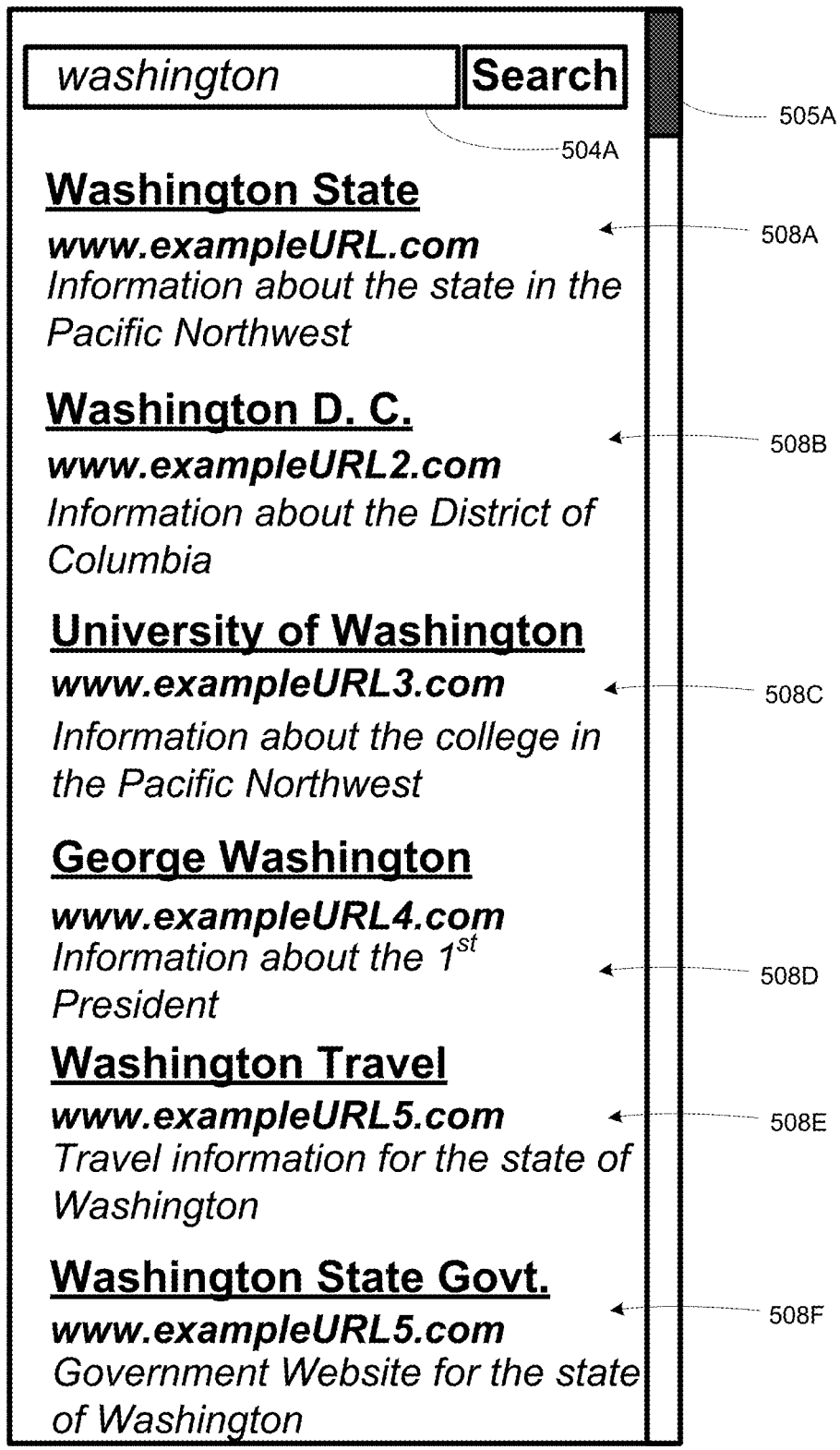
FIG. 5A is an example graphical user interface illustrating an example of an initial display of search results for a search query.

The search results 108 are transmitted to the client device 106 in a form that may be presented to the user. For example, the search results 108 may be transmitted as a search results web page to be displayed via the browser 107 executing on the client device 106 and/or as one or more search results conveyed to a user via audio. FIG. 5A presents one example of a search results webpage and is described in additional detail herein. The search results 108 may be presented to the user based on the ranking of the corresponding search result documents. For example, when the search results 108 are presented as a search results web page, the search results 108 may be displayed based on the ranking of the corresponding search result documents. For example, the most prominently displayed search result may be the highest ranked search result, the next most prominently displayed search result may be the second highest ranked search result, and so forth. In some implementations a presentation of search results 108 may include a subset of all of the search results for a search query. For example, an initial search results webpage may include the top X ranked search results 108 and may include a link to view additional search results webpages that each includes additional search results ranked lower than the top X ranked search results. Thus, in some implementations search results 108 that are transmitted to client device 106 and modified in response to a selection of one of the search results 108 may only be a subset of all search results responsive to the search query 104.

As described herein, in some implementations the search results 108 may be provided to the client device 106 in combination with search result set information identifying one or more sets of search results to which the search results 108 belong and/or with instructions to modify the display of the search results based on a selection of one of the search results 108. For example, the search results 108 may be provided as a webpage that includes HTML code and content mapped in the HTML code. The HTML code itself and/or the content mapped in the HTML code may include search result information identifying, for each search result, to which of one or more sets of search results the search result belongs. The content mapped in the HTML code may additionally and/or alternatively include instructions, such as instructions in a client-side script implementation such as an ECMAScript, that may be accessed by the client device 106 and executed, in whole or in part, by the client device 106 to modify the search results 108. For example, the instructions may be provided as JavaScript instructions that are mapped in a search results webpage and the browser 107 may execute the JavaScript instructions to modify the display of the search results 108 based on a selection of one of the search results 108. For example, the instructions may include instructions to determine the selection of a search result, identify the one or more sets of search results associated with the selected search result, and modify the display of search results to omit any search results that are not associated with the one or more sets of search results associated with the selected search result. For example, the display of search results may be modified by hiding, via manipulation of the search results webpage in the browser 107, the content of any search results that are not associated with the one or more sets of search results associated with the selected search result.

In some implementations the instructions to modify the search results 108 based on a selection of one of the search results 108 may be executed, in whole or in part, by the search system 102. For example, an indication of a user selection of a search result via the client device 106 may be provided to the search system 102, and the search system 102 may execute the instructions to modify the search results and provide the modified search results to the client device 106. For example, the modified search results may be provided as a new search results webpage to the client device 106 and/or may be communicated to the client device 106 via a script executing on the client device 106 to enable the client device 106 to update the search results webpage to include the modified search results.

The ranking engine 110 includes an entity cluster module 112 and an instruction module 114. In some implementations the entity cluster module 112 and/or the instruction module 114 may be combined and/or provided as modules separate from the ranking engine 110. In some implementations the entity cluster module 112 may perform aspects of one or more of the steps of FIG. 2 such as steps 210 and/or 215. In some implementations the instruction module 114 may perform aspects of one or more of the steps of FIG. 2 such as step 230.

The entity cluster module 112 determines sets of search results based on entities associated with the search results 108 that are responsive to the search query 104. The sets of search results are determined so that each set includes one or more search results that are each associated with at least one shared entity. For example, the entity cluster module 112 may determine a first set of search results that are all associated with a shared entity A and a second set of search results that are all associated with a shared entity B. The search results 108 responsive to a search query 104 for which sets of search results are determined may be all search results responsive to the query or may be a subset of search results. For example, in implementations in which an initial search results webpage is initially provided that includes a subset of the search results, the search results responsive to a query for which sets of search results are initially determined may be those search results that will be included on the initial search results webpage.

In some implementations, the entity cluster module 112 may determine an entity that is associated with a search result by referencing index 125 and/or other database that contains information related to one or more entities associated with a search result and/or a document associated with a search result. For example, as described herein, index 125 may contain, for each of a plurality of documents, a mapping between the document and one or more entities related with the document. Thus, in some implementations the index 125 may be referenced to identify one or more entities associated with the search result document that is associated with a search result.

In some implementations, the entity cluster module 112 determines a single entity for each search result. For example, in some implementations the index 125 and/or other database may only identify, for each document, the single entity most strongly associated with that document. Also, for example, in some implementations the index 125 and/or other database may identify, for each document, one or more entities related to that document and the entity cluster module 112 may select a single entity from the one or more entities. For example, each entity for a document may be associated with an entity score that indicates the strength of the association of the entity to the document and one of the entities may be selected based on the entity score. For example, scores from 0 to 1 may be associated with each of the entities, with 1 being most indicative of relation of the entity to the document, and the entity associated with the highest entity score may be selected.

With reference to FIG. 4A, an example method of determining sets of search results based on a single entity for each of the search results is described. FIG. 4A illustrates a table listing search results S1-S10 in the first column and entities associated with each of the search results S1-S10 in the second column. For example, search result S1 has an associated entity A, search result S2 has an associated entity A, search result S3 has an associated entity B, and so forth. In some implementations the entities of the second column represent the entity that is most strongly associated with the search result document. In some of those implementations the entity cluster module 112 may determine the entities of the second column by identifying a search result document associated with the search result and identifying an entity associated with the search result document. A numerical identifier of each of the sets of search results associated with each of the search results S1-S10 is illustrated in the third column. Other identifiers may be utilized such as non-numerical identifiers. The entity cluster module 112 determines the sets of search results based on the entity of the second column. Those search results associated with entity A have been determined to be in set 1, those search results associated with entity B have been determined to be in set 2, those search results associated with entity C have been determined to be in set 3, the search result associated with entity D has been determined to be in set 4, and the search result that is non-associated with an entity (as indicated by "?") has been determined to be in set 5. A search result may be non-associated with an entity based on insufficient data related to the search result document associated with the search result and/or based on no entity being associated strongly enough with the search result document. For example, in some implementations entity scores may be associated with each entity associated with a document and a search result may be non-associated with an entity if no entity score satisfies a threshold entity score indicative of at least a threshold strength of association with the document.

In some implementations, the entity cluster module 112 determines multiple entities for one or more search results. For example, in some implementations the index 125 and/or other database may identify, for each document, all entities associated with that document. Also, for example, in some implementations the index 125 and/or other database may identify, for each document, one or more entities related to that document and the entity cluster module 112 may select a subset of one or more of the entities. For example, each entity for a document may be associated with an entity score that indicates the strength of the association of the entity with the document and multiple entities may be selected based on the entity score. For example, scores from 0 to 1 may be associated with each of the entities, with 1 being most indicative of association of the entity to the document, and any entities satisfying a threshold entity score indicative of at least a threshold strength of association to the document may be selected.

With reference to FIG. 4B, an example method of determining sets of search results based on one or more entities for each of the search results is described. FIG. 4B illustrates a table listing search results S11-S20 in the first column and entities associated with each of the search results S11-S20 in the second column. For example, search result S11 has an associated entity A, search result S12 has associated entities A and B, search result S13 has an associated entity B, and so forth. In some implementations the entities of the second column represent entities that satisfy at least a threshold strength of association to the search result document. In some of those implementations the entity cluster module 112 may determine the entities of the second column by identifying a search result document associated with the search result and identifying one or more entities associated with the search result document. A numerical indication of each of the sets of search results associated with each of the search results S11-S20 is illustrated in the third column. The entity cluster module determines the sets of search results based on the entity of the second column. Those search results associated with entity A have been determined to be in set 1, those search results associated with entity B have been determined to be in set 2, those search results associated with entity C have been determined to be in set 3, and those search results associated with entity D have been determined to be in set 4. It is noted that search results S12 and S18 are each associated with both set 1 and set 2 as they are each associated with both entity A and entity B.

In some implementations, the entity cluster module 112 may provide the search results 108 to the client device 106 with search result set information that provides an indication of which of the search results belong to each of the sets of search results. For example, each of the search results 108 may be associated with embedded information that associates the search result with one or more of the sets of search results. Also, for example, the search results 108 may be provided as a search results webpage and the search results webpage may include embedded tags that identify, for each of the sets of search results, which of the search results belong to the set of search results. As described herein, any provided search result set information may be utilized by the client device 106 to determine modified search results. Also, as described herein, in some implementations the sets of search results determined by the entity cluster module 112 may be utilized by the search system 102 to determine modified search results. In some of those implementations the search result set information may not be provided to the client device 106.

The instruction module 114 determines and/or provides instructions to modify the search results 108 based on a selection of one of the search results 108. Generally, the instructions include instructions to: determine a selection of a search result of the search results 108, wherein the selection is indicative of navigation, via the computing device 106, to a search result document that is linked to by the selected search result; and/or determine, based on the selection of the search result, modified search results that include search results that are associated with the same one or more sets of search results as the selected search result and that omit or demote search results that are not members of the same one or more sets of search results as the selected search result. The modified search results may be provided in place of the search results 108. For example, with reference to FIG. 4A, a user selection of search result S1 from a search results webpage listing search results S1-S10 to navigate to a document linked to by search result S1 may be determined; modified search results may be determined that include search results S1, S2, and S9 that are associated with the same set of search results as document S1 (set 1) and that omit or demote search results S3-S8 and S10 that are associated with other search result sets (e.g., sets 2-5); and the modified search results including search results S1, S2, and S9 may be provided to the user in place of the search results 108. For example, the modified search results may be displayed to the user when the user navigates back to the search results webpage from the document linked to by search results S1.

In some implementations the instructions to modify the search results 108 may be provided to the client device 106 for execution on the client device 106. For example, the instructions may be included with and/or mapped in a provided search results webpage as a client-side script and the client device 106 may access the script and execute the instructions to modify the display of search results. For example, the search results 108 may be provided as search results webpage that includes search result set information that associates each search result with one or more of the sets of search results and that includes the instructions to modify the search results 108. The browser 107 may provide an initial display of the search results 108 that includes search results from all of the sets of search results. The browser 107 may execute the instructions to: determine a selection of a search result of the search results 108; determine with which set of search results the selected search result is associated based on the search result set information; determine, based on the search result set information and based on the selection, modified search results that include search results that are associated with the same set of search results as the selected search result and that omit or demote search results that are not members of the same set of search results as the selected search result; and provide the modified search results in place of the search results 108. For example, the modified search results may be provided in place of the search results 108 by the client device 106 by hiding search results that are not members of the same set of search results as the selected search result, changing display characteristics of search results that are not members of the same set of search results as the selected search result, etc.

In some other implementations the instructions to modify the search results based on a selection of one of the search results may be provided for use by the search system. For example, the instructions may be executed, in whole or in part, by the search system 102. For example, an indication of a user selection of a search result may be received via input from the client device 106, and the ranking engine 110 may execute the instructions to modify the display of the search results and provide the modified search results to the client device 106. For example, the modified search results may be provided as a new search results webpage to be loaded on the client device 106 and/or may be communicated to the client device 106 via a script executing on the client device 106 to enable the client device 106 to update a search results webpage. For example, the modified search results may be provided by the search system 102 by communicating, to client device 106, one or more changes to be made to an initial display of search results such as dimming of certain of the search results, hiding of certain of the search results, etc.

In some implementations the instructions to modify the search results may be fixed instructions and may be executed with reference to search result set information of search results to enable appropriate modification of search results. In some implementations the search result set information may be utilized in determining instructions to modify search results based on user selection of one of the search results. For example, the instructions may be determined particularly for the search results and incorporate and/or embed the search result set information.

Figure 3:
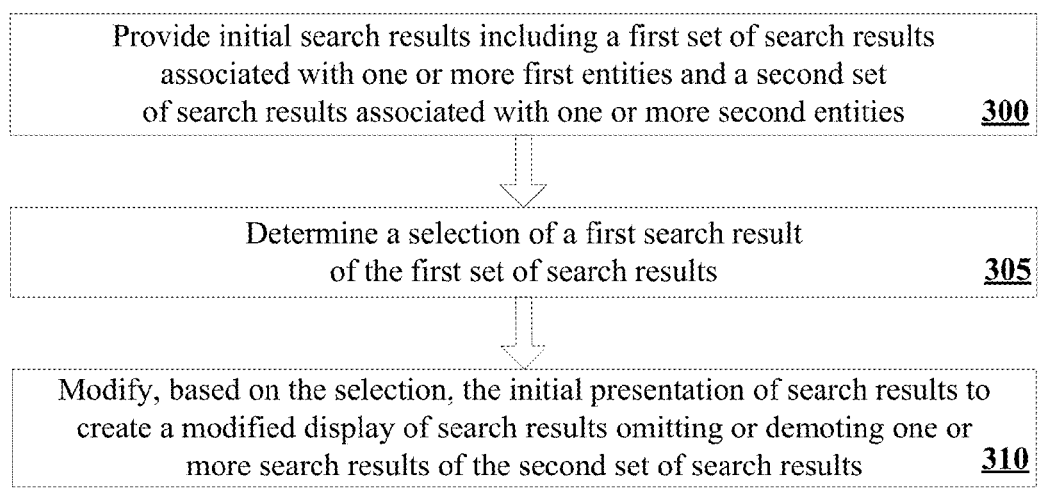
FIG. 3 is a flow chart illustrating an example method of modifying search results based on selection of one of the search results.

With reference to FIGS. 5A-5C3, example graphical user interfaces are illustrated and utilized in describing example methods of modifying an initial display of search results based on selection of one of the search results. The example graphical user interfaces of FIGS. 5A-5C3 may be displayed to a user via one or more applications executing on client device 106 such as browser 107.

FIG. 5A is an example graphical user interface illustrating an example of an initial display of search results for a search query. In FIG. 5A the search query "washington" 504A is submitted to a search system 102, via the graphical user interface, and a set of search results that are responsive to the search query 504A are generated by the search system 102 and provided for presentation in the user interface. The search results in FIG. 5A include search results 508A-F that are based on search result documents responsive to the query. The search results 508A-F may be ranked according to one or more signals as described herein such as document based signals and/or query based signals. Additional search results may be accessed in FIG. 5A by scrolling down in the user interface utilizing scroll element 505A, a user gesture on a presence-sensitive input mechanism (e.g., swiping via a touch-screen device), a mouse scroll, etc.

The search results 508A, 508E, and 508F may all be members of a first set of search results as they are all most strongly associated with a shared entity associated with the state of Washington. The search result 508B may be a member of a second set of search results as it is most strongly associated with an entity associated with the District of Columbia. The search result 508C may be a member of a third set of search results as it is most strongly associated with an entity associated with the University of Washington. In some implementations, the entity cluster module 112 may determine the sets of search results utilizing one or more techniques such as those described herein. For example, the entity cluster module 112 may determine a single entity for each search result and determine the sets of search results based on the determined single entity for each search result. A user may select any of the search results 508A-F of FIG. 5A to navigate to a document associated with the selected search result. The navigation to the document may occur in the same display as the display of FIG. 5A and/or the navigation to the document may occur via opening a new window or tab, while maintaining the search results webpage of FIG. 5A in a separate window or tab.

Figure 5B:
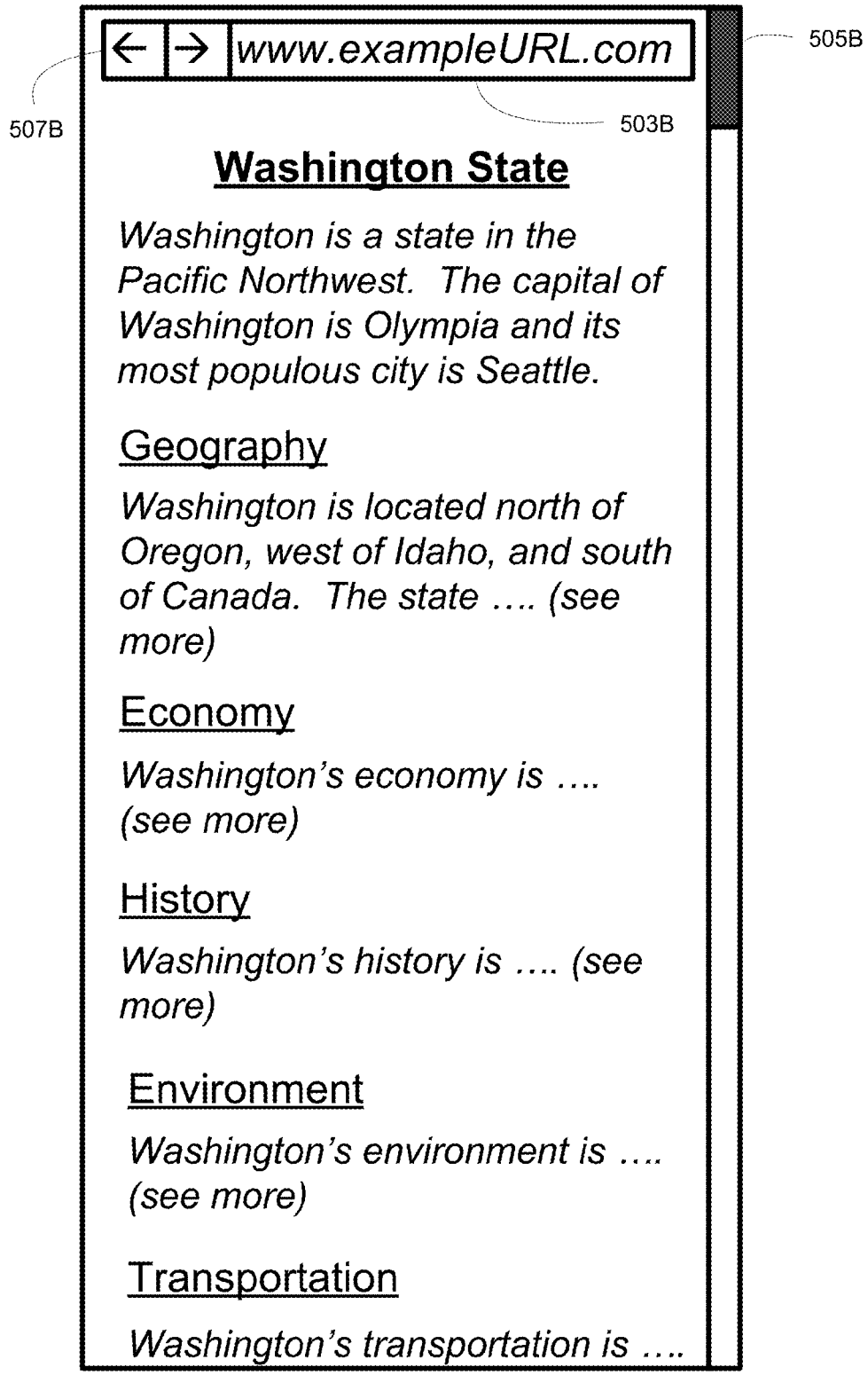
FIG. 5B is an example graphical user interface illustrating an example of a document associated with one of the search results of FIG. 5A.

FIG. 5B is an example graphical user interface illustrating an example of a document associated with the search result 508A of FIG. 5A. The document may be navigated to via a selection of the search result 508A in FIG. 5A. In FIG. 5B the Uniform Resource Locator (URL) 503A of the document is displayed. It is noted that the URL of the document may have a second-level domain name ("exampleURL") that is distinct from a second-level domain name associated with the display of search results of FIG. 5A. In other words, the document may be hosted on a website that is distinct from the website providing the search results of FIG. 5A. Content of the document is displayed in the graphical user interface of FIG. 5B and includes information related to the state of Washington. Additional content of the document may be accessed in FIG. 5B by scrolling down in the user interface.

A navigation back element 507B is also illustrated in FIG. 5B. A user may select the navigation back element 507B to enable the user to navigate back to the search results webpage from which the navigation to the document of FIG. 5B occurred. In some other implementations a navigation back element may be provided that enables a user to navigate between multiple tabs or windows. For example, in some implementations the user may select the search result 508A of FIG. 5A so that the document of FIG. 5B opens in a new display such as a new window or tab, while maintaining the search results webpage of FIG. 5A in a separate window or tab. A user may be presented with a navigation back element in FIG. 5B that enables navigation back to the separate window or tab in which the search results webpage of FIG. 5A is maintained.

FIGS. 5C1, 5C2, and 5C3 are example graphical user interfaces illustrating three separate examples of a modified display of the search results of FIG. 5A based on the user selection of the search result 508A of FIG. 5A. Additional and/or alternative graphical user interfaces may be utilized, including those that combine aspects from one or more of the examples of FIGS. 5C1, 5C2, and 5C3. In some implementations the modified display of the search results may be provided in lieu of the search results of FIG. 5A when the user navigates back to the search results page of FIG. 5A from the document of FIG. 5B. For example, the modified display of the search results may be provided when the user selects the navigation back element 507B to navigate back to the search results page of FIG. 5A and/or navigates back to a separate window or tab in which the search results webpage of FIG. 5A is maintained. The modification of the search results may occur, for example, prior to navigation back to the search results webpage (e.g., when the search results is selected), in response to navigation back to the search results webpage, or in response to navigation back to the search results webpage and confirmation by the user of a desire to modify the search results webpage (e.g., via a prompt presented to the user prior to modifying the search results).

As described herein, the instruction module 114 may provide instructions to enable modification of the search results webpage of FIG. 5A to create a modified display of search results as illustrated in one or more of the example graphical user interfaces of FIGS. 5C1, 5C2, and 5C3. Based on the instructions and the sets of search results determined via the entity cluster module 112, the search system 102 and/or the client device 106 may determine the modified display of search results in response to a user selection of one of the search results of FIG. 5A. In some implementations the instructions to modify the search results may be provided for execution on the client device 106. For example, the search results webpage of FIG. 5A may be provided to the client device 106 by the search system 102 with search result set information that associates each search result with one or more of the sets of search results and that includes the instructions to modify the search results in response to a user selection of one of the search results. The browser 107 may provide the initial display of the search results in FIG. 5A that includes search results from all of the sets of search results. The browser 107 may execute the instructions to determine a selection of the search result 508A; determine the search result 508A is associated with the first set of search results based on the search result set information; determine modified search results that include search results that are also members of the first set of search results and that omit or demote search results that are not members of the first set of search results; and provide the modified search results in place of the search results 108.

In some implementations the instructions to modify the search results based on a selection of one of the search results may be provided to the search system 102 and executed, in whole or in part, by the search system 102. For example, an indication of a user selection of the search result 508A may be received by the search system 102, and the ranking engine 110 may execute the instructions to modify the display of the search results and provide the modified display of search results to the client device. For example, the modified display of search results may be provided as a new search results webpage to the client device 106 and/or may be communicated to the client device 106 to enable the client device 106 to update a search results webpage.

FIG. 5C1 is an example graphical user interface illustrating an example of a modified display of the search results of FIG. 5A based on the user selection of the search result 508A of FIG. 5A. In the example graphical user interface of FIG. 5C1, those search results that are members of the first set of search results that were provided on the search results webpage of FIG. 5A have been maintained and the search results associated with the other sets of search results have been omitted. In particular, search results 508A, 508E, and 508F that are members of the first set of search results have been maintained and search result 508G is also maintained and is likewise a member of the first set of search results as it is most strongly associated with the entity associated with the state of Washington. The search result 508G may be an additional search result that was provided on the search results webpage of FIG. 5A and may have been accessed in FIG. 5A by scrolling down in the user interface.

Also provided in FIG. 5C1 is a search result set summary 509 that illustrates that a filter is currently being applied to show results from the first set of search results that are associated with the entity associated with the state of Washington and to omit search results from the other sets of search results that are associated with distinct entities. The search result summary 509 also illustrates the number of search results of the search results webpage of FIG. 5A that are associated with each of the listed entities. It is noted that some of the search results of the search result summary 509 may be additional search results that were provided on the search results webpage of FIG. 5A and may have been accessed in FIG. 5A by scrolling down in the user interface. The search result summary 509 also provides the user the option to select "click to hide" to hide results about the first set of search results that are associated with the entity associated with the state of Washington and with options to "click to show" to reshow a respective set of search results that are associated with a distinct entity. For example, selecting "click to show" in the row listing Washington (D.C.) may reshow search results associated with the entity associated with the District of Columbia.

In some implementations selecting an additional search results page from the listing of search results pages 501, may present a new search results page that includes additional search results responsive to the search query "washington" and that show results from the first set of search results that are associated with the entity associated with the state of Washington and omit search results from the other sets of search results that are associated with distinct entities. For example, selecting "2" in the listing of search results pages 501 may navigate to a second search results page including additional search results that are ranked lower than the search results of the first search results page and only those search results of the page that are associated with the first set of search results may be displayed.

Figure 2:
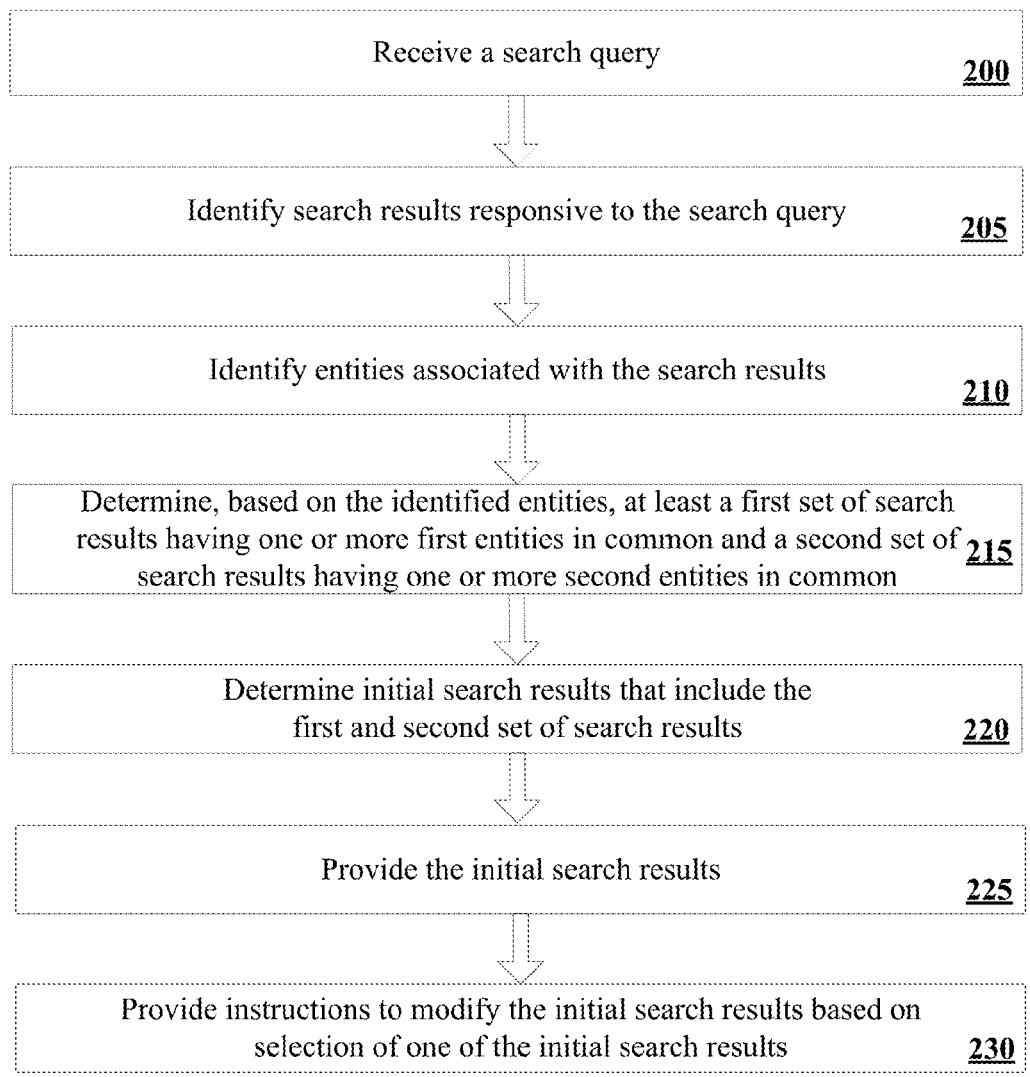
FIG. 2 is a flow chart illustrating an example method of providing search results and providing instructions to modify the search results.

FIG. 5C2 is an example graphical user interface illustrating another example of a modified display of the search results of FIG. 5A based on the user selection of the search result 508A of FIG. 5A. In the example graphical user interface of FIG. 5C2, those search results that are members of the first set of search results that were provided on the search results webpage of FIG. 5A have been maintained and the search results associated with the other sets of search results have been demoted by increasing an amount of dimming associated with those search results. In particular, in the interface of FIG. 5C2 search results 508A, 508E, and 508F that are members of the first set of search results are visible and search results 508B, 508C, and 508D are demoted by increasing an amount of dimming associated with those search results. Generally, as used herein, increasing an amount of dimming includes changing the color of text, images, and/or other content of a search result to a lighter color (e.g., increasing the amount of white in black text) and/or increasing the amount of translucency in text, images, and/or other content of a search result. It is noted that additional search results may be accessed in FIG. 5A by scrolling down in the user interface. Any of such additional search results associated with sets of search results besides the first set of search results may likewise be displayed with an increased amount of dimming to demote such search results.

Additional and/or alternative techniques for demoting a display of a search result by altering a display parameter of the search result may be utilized in addition to and/or as an alternative to increasing an amount of dimming of the search result. For example, text and/or other content of the search result may be stricken through, text and/or other content of the search result may be decreased in size, and/or the search result may be highlighted in a certain color indicating its demotion. Also, for example, the display parameters of the search results of the first set of search results may be promoted to thereby demote the other search results. For example, the text and/or other content of the search results of the first set may be increased in size and/or highlighted in a certain color indicating promotion. In some implementations the display of FIG. 5C2 may be provided with a search result set summary such as one similar to search result summary 509 of FIG. 5C1 and/or may be provided with a listing of additional search results pages such as listing of search results pages 501 of FIG. 5C1.

FIG. 5C3 is an example graphical user interface illustrating another example of a modified display of the search results of FIG. 5A based on the user selection of the search result 508A of FIG. 5A. In the example graphical user interface of FIG. 5C3, those search results that are members of the first set of search results that were provided on the search results webpage of FIG. 5A have been maintained and the display positions of some of the search results of the first set of search results have been promoted. In particular, in the interface of FIG. 5C3 search results 508A, 508E, and 508F that are members of the first set of search results are maintained and search result 508G is also maintained. As described with respect to FIG. 5C1, search result 508G is likewise a member of the first set of search results and may be an additional search result that was provided on the search results webpage of FIG. 5A and may have been accessed in FIG. 5A by scrolling down in the user interface. Also, in the interface of FIG. 5C3 the display position of search results 508E, 508F, and 508G that are members of the first set of search results have been promoted.

In the interface of FIG. 5C3 search results 508B and 508C that are not members of the first set of search results are demoted by increasing an amount of dimming associated with those search results and by demoting the display position of the search results 508B and 508C. It is noted that additional search results may be accessed in FIG. 5A by scrolling down in the user interface. Any of such additional search results associated with sets of search results besides the first set of search results may likewise be displayed with an increased amount of dimming to demote such search results and/or the display position demoted. Additional and/or alternative techniques for demoting a display of a search result by altering a display parameter of the search result may be utilized in addition to and/or as an alternative to dimming of the search result such as those described herein. Also, although FIG. 5C3 illustrates both dimming and demoting of the display position of the search results that are not members of the first set, in some implementations only demoting of the display position may be utilized. In some implementations the display of FIG. 5C3 may be provided with a search result set summary such as one similar to search result summary 509 of FIG. 5C1 and/or may be provided with a listing of additional search results pages such as listing of search results pages 501 of FIG. 5C1.

Many other configurations are possible having more or fewer components than the environment shown in FIG. 1. For example, in some environments the entity cluster module 112 and/or the instruction module 114 may be combined.

FIG. 2 is a flow chart illustrating an example method of providing initial search results and providing access to instructions to modify the initial search results. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the search system 102 of FIG. 1.

At step 200, a search query is received. In some implementations the search system 102 may receive the search query from a computing device such as client device 106.

At step 205, search results are identified based on the search query received at step 200. For example, in some implementations the ranking engine 110 may use the index 125 to identify documents responsive to the search query and determine search results associated with such documents.

At step 210, entities are identified that are associated with the search results identified at step 205. In some implementations, the entity cluster module 112 may determine an entity that is associated with a search result by referencing index 125 and/or other database that contains information related to one or more entities associated with a search result and/or a document associated with a search result. For example, index 125 may contain, for each of a plurality of documents, a mapping between the document and one or more entities related with the document. Thus, in some implementations the index 125 may be referenced to identify one or more entities associated with the search result document that is associated with a search result.

At step 215, at least a first set of search results and a second set of search results are determined. The first set of search results includes one or more search results each associated with one or more first entities of the entities identified at step 210. The second set of search results includes one or more search results each associated with one or more second entities of the entities identified at step 210. One or more of the first entities are distinct from one or more of the second entities. In some implementations more than two sets of search results may be determined. In some implementations, the entity cluster module 112 determines sets of search results responsive to a search query based on entities associated with the search results. For example, the entity cluster module 112 may determine a first set of search results that are all associated with a shared entity A and a second set of search results that are all associated with a shared entity B. The search results responsive to a query for which sets of search results are determined may be all search results responsive to the query or may be a subset of search results.

At step 220, initial search results that include the first and second set of search results are determined. For example, the initial search results may include the top X ranked search results of those identified at step 205. As described herein, in some implementations the ranking engine 110 may determine a ranking of the search results. The initial search results may include one or more search results from the first set of search results and one or more search results from the second set of search results.

At step 225, the initial search results are provided. For example, the search system 102 may transmit the initial search results to the client device 106 in a form that may be provided to the user. For example, the search results 108 may be transmitted as a search results web page to be displayed via the browser 107 executing on the client device and/or as one or more search results conveyed to a user via audio. FIG. 5A presents one example of a search results webpage and is described in additional detail herein.

At step 230, instructions to modify the initial search results are provided. The instructions are instructions to modify the initial search results based on selection of one of the initial search results. Generally, the instructions to modify the initial search results include instructions to: determine a selection of a search result of the search results provided at step 225, wherein the selection is indicative of navigation of a search result document that is linked to by the selected search result; and determine, based on the selection of the search result, modified search results that include search results that are associated with the same one or more sets of search results as the selected search result and that omit or demote search results that are not members of the same one or more sets of search results as the selected search result. For example, with reference to FIG. 4A, the instructions may be executed to: determine a user selection of search result S1 from a search results webpage listing search results S1-S10; determine modified search results that include search results S1, S2, and S9 that are associated with the same set of search results as document S1 (set 1) and that omit or demote search results S3-S8 and S10 that are associated with other search result sets (e.g., sets 2-5). The modified search results including search results S1, S2, and S9 may be provided to the user in place of the search results 108. For example, the modified search results may be displayed to the user when the user navigates back to the search results webpage from the document linked to by search results S1 and/or from one or more documents navigated to following navigation to the document linked to by the search results S1 (e.g., additional links provided in the document).

In some implementations the instructions may be provided to a client device to which the initial search results are provided at step 225. For example, the instructions may be included with and/or mapped in a provided search results webpage as a client-side script and the client device 106 may access the script and execute the instructions to modify the search results. In some implementations, when instructions are provided to the client device 106, search result set information may be provided to the client device 106 to determine which search results to maintain, omit, and/or demote in response to a user selection of a search result. Such search result information may be provided with the initial search results at step 225 and/or may be embedded in the instructions to which access is provided at step 230. In some implementations access to the instructions may be provided to the search system 102 and the search system 102 may execute, in whole or in part, the instructions to modify the search results based on a selection of one of the search results. For example, an indication of a user selection of a search result via client device 106 may be received by the search system 102, and the ranking engine 110 may execute the instructions to modify the display of the search results and provide the modified display of search results to the client device 106. For example, the modified search results may be provided as a new search results webpage to the client device 106 and/or may be communicated to the client device 106 via a script executing on the client device 106 to enable the client device 106 to update a search results webpage. In some implementation, executing the instructions, by a client device and/or the search system, may include steps 305 and/or 310 of FIG. 3.

FIG. 3 is a flow chart illustrating an example method of modifying search results based on selection of one of the search results. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the search system 102 of FIG. 1 and/or the client device 106 of FIG. 1.

At step 300, initial search results are provided that include a first set of search results associated with one or more first entities and a second set of search results associated with one or more second entities. In some implementations more than two sets of search results may be included. In some implementations step 300 may be performed by the search system 102. For example, the search system 102 may provide the initial search results to the client device 106 in a form that may be provided to the user. For example, the search results 108 may be transmitted as a search results web page to be displayed via the browser 107 executing on the client device 106 and/or as one or more search results conveyed to a user via audio. In implementations in which step 300 is performed by the search system 102, step 300 may share one or more aspects in common with step 225 of FIG. 2. In some implementations step 300 may additionally and/or alternatively be performed by the client device 106. For example, the client device 106 may provide an initial presentation of the search results to a user by providing output to enable presentation of the search results to the user, such as visual and/or audible presentation of the search results. For example, the browser 107 may provide an initial display of search results by providing output enabling the search results to be viewed on a screen by a user.

At step 305, a selection of a first search result of the first set of search results is determined. In some implementations step 305 may be performed by the search system 102. For example, the search system 102 may receive an indication of a user selection of a search result. In some implementations the indication of a user selection of a search result may be received via an input from client device 106. For example, the client device 106 may determine a user selection of a search result and transmit an indication of the selection of the search results to the search system 102. In some implementations step 305 may additionally and/or alternatively be performed by the client device 106. For example, the client device 106 may determine a user selection of a search result based on a user selection of the search result via an application executing on the client device 106 such as browser 107. For example, the browser 107 may be executing the instructions of step 230 to monitor for a selection of a search result on a search results webpage. In some implementations the first search result may be a search result that links to a document that is hosted on a website that is distinct from the website providing the search results. In some implementations the first search result may be a search result that links to a document that is not a search results webpage providing search results for a unique query.

At step 310, the initial search results are modified based on the selection to create a modified display of search results that omit or demote one or more search results of the second set of search results. In implementations where more than two sets of search results are included at step 300, additional sets of search results may be omitted or demoted in the modified display of search results at step 310. In some implementations step 310 may be performed by the search system 102. For example, an indication of a user selection of a search result via the client device 106 may be provided to the search system 102, and the search system may modify the display of the search results and provide the modified display of search results to the client device 106. For example, the modified display of search results may be provided as a new search results webpage to the client device 106 and/or may be communicated to the client device 106 via an ECMAS script executing on the client device 106 to enable the client device 106 to update the search results webpage. In some implementations step 310 may be performed by the search system 102 without issuing of a new search query. In some other implementations the search system 102 may issue a new search query that is more focused on the entity associated with the first set of search results and provide search results from the new search query as a new search results webpage to the client device 106.

In some implementations step 310 may additionally and/or alternatively be performed by the client device 106. For example, the client device 106 may identify the one or more sets of search results associated with the selected search result, and modify the search results to omit any search results that are not associated with the one or more sets of search results associated with the selected search result. For example, the search results may be modified by hiding the content of any search results that are not associated with the one or more sets of search results associated with the selected search result via manipulation of the search results webpage in the browser 107. In some implementations the client device 106 may perform step 310 based on instructions provided as script instructions that are provided and/or mapped with initial search results provided via the search system 102. For example, the instructions may be provided as JavaScript instructions that are mapped in a search results webpage and the browser 107 may execute the JavaScript instructions.

The user may be provided with the modified presentation of search results. For example, the client device 106 may provide the modified presentation of search results to a user by providing output to enable presentation of the modified presentations of search results to the user, such as visual and/or audible presentation of the search results. For example, the browser 107 may provide the modified display of search results to the user in lieu of the initial display of search results provided at step 300 when the user navigates back to the search results from the document associated with the selected search result at step 305.

Figure 6:
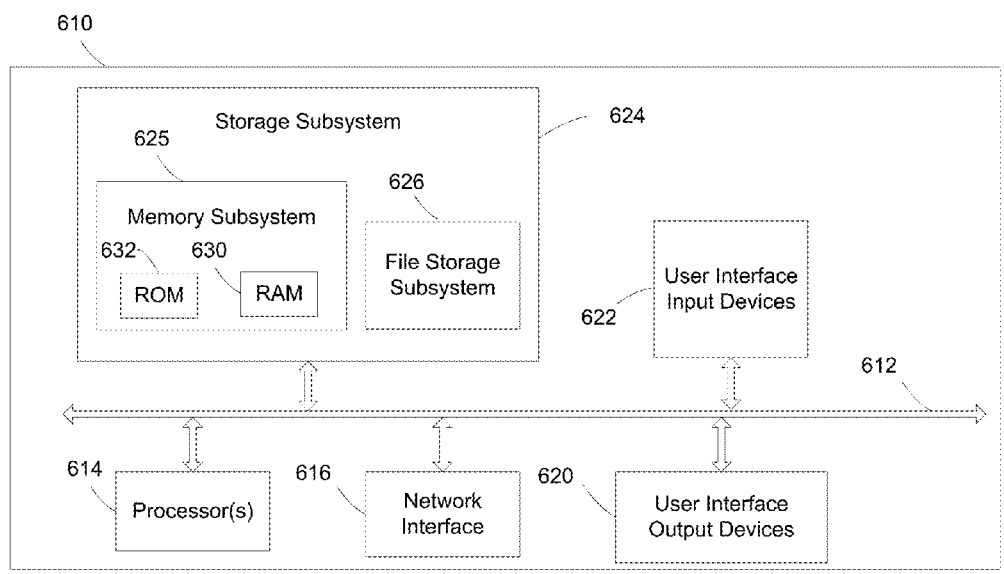
FIG. 6 illustrates an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to provide initial search results, provide instructions to modify the initial search results based on selection of one of the initial search results, and/or modify initial search results based on selection of one of the search results.

These software modules are generally executed by processor 614 alone or in combination with other processors. Memory 625 used in the storage subsystem can include a number of memories including a main random access memory (RAM) 630 for storage of instructions and data during program execution and a read only memory (ROM) 632 in which fixed instructions are stored. A file storage subsystem 624 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 624 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
providing initial search results that are responsive to a search query, the initial search results including a first set of search results that are each associated with a first entity and a second set of search results that are each associated with a second entity;
  wherein the first entity is distinct from the second entity; and
  wherein the first set of search results include one or more search results that are distinct from one or more of the search results of the second set of search results;
determining a selection of a first search result of the first set of search results, the selection of the first search result indicative of retrieval of a first document linked to by the first search result; and
modifying, based on the selection of the first search result, the initial search results to create modified search results, wherein modifying the initial search results includes maintaining multiple search results of the first set of search results and omitting the search results of the second set of search results that are not of the first set of search results, and
providing, in response to the selection of the first search result, a search result summary for display with the modified search results, wherein the search result summary comprises:
  an omitted search results indication, the omitted search results indication indicating that the search results of the second set of search results that are not of the first set of search results are being omitted,
  a second entity identifier that identifies the second entity, and an indication that the second entity identifier is associated with the search results of the second set of search results that are not of the first set of search results and that are being omitted.

2. The method of claim 1, further comprising:
providing the modified search results in response to the selection of the first search result.

3. The method of claim 1, wherein modifying the initial search results includes:
maintaining only search results of the first set of search results in the modified search results.

4. The method of claim 1, wherein the initial search results are provided as a search results webpage and wherein the selection of the first search result includes navigation to the first document from the search results webpage.

5. The method of claim 4, wherein the first document is associated with a first uniform resource locator having a first second-level domain name and wherein the search results webpage is associated with a second uniform resource locator having a second second-level domain name distinct from the first second-level domain name.

6. The method of claim 4, further comprising:
providing the modified search results in a navigation back to the search results webpage after the navigation to the first document from the search results webpage.

7. The method of claim 6, wherein the navigation to the first document includes navigation to the first document in a first display of a browser while maintaining the search results webpage in a second display of the browser and wherein the navigation back to the search results webpage includes viewing of the second display after viewing of the first display.

8. The method of claim 4, wherein modifying the initial search results includes:
generating a modified search results webpage to supplant the search results webpage.

9. The method of claim 4, wherein modifying the initial search results includes:
modifying one or more presentation parameters of the search results webpage to provide the modified search results.

10. The method of claim 1, further comprising:
receiving the search query;
identifying the initial search results that are responsive to the search query;
identifying, for each search result of the initial search results, one or more entities associated with the search result;
determining one or more of the initial search results to include in the first set of search results based on association with the first entity of the entities; and
determining one or more of the initial search results to include in the second set of search results based on association with the second entity of the entities;
wherein providing the initial search results includes providing the initial search results to a client device.

11. The method of claim 1, wherein the search results of the first set of search results are all distinct from the search results of the second set of search results.

12. The method of claim 1, wherein providing the initial search results that are responsive to the query includes:
providing the initial search results to a client device to present the initial search results to a user.

13. The method of claim 1, wherein providing the initial search results that are responsive to the query includes:
presenting the initial search results to a user.

14. The method of claim 1, wherein:
the initial search results further include a third set of search results that are each associated with a third entity, wherein the third entity is distinct from the first entity and the second entity, and wherein the third set of search results include one or more search results that are distinct from one or more of the search results of the first set of search results and the second set of search results;
the modifying the initial search results to create modified search results further comprises omitting the search results of the third set of search results that are not of the first set of search results; and
the search result summary for display with the modified search results further comprises:
an additional omitted search results indication, the additional omitted search results indication indicating that the search results of the third set of search results that are not of the first set of search results are being omitted,
a third entity identifier that identifies the third entity, and
an indication that the third entity identifier is associated with the search results of the third set of search results that are not of the first set of search results that are being omitted.

15. The method of claim 1, wherein the search result summary for display with the modified search results further comprises a selectable option to further modify the modified search results to reshow the search results of the second set of search results that are not of the first set of search results and that are being omitted.

16. A system including memory and one or more processors operable to execute instructions stored in the memory, comprising instructions to:
provide initial search results that are responsive to a search query, the initial search results including a first set of search results that are each associated with a first entity and a second set of search results that are each associated with a second entity;
wherein the first entity is distinct from the second entity; and
wherein the first set of search results include one or more search results that are distinct from one or more of the search results of the second set of search results;
determine a selection of a first search result of the first set of search results, the selection of the first search result indicative of retrieval of a first document linked to by the first search result; and
modify, based on the selection of the first search result, the initial search results to create modified search results, wherein modifying the initial search results includes maintaining multiple search results of the first set of search results and omitting the search results of the second set of search results that are not of the first set of search results, and
provide, in response to the selection of the first search result, a search result summary for display with the modified search results, wherein the search result summary comprises:
an omitted search results indication, the omitted search results indication indicating that the search results of the second set of search results that are not of the first set of search results are being omitted,
a second entity identifier that identifies the second entity, and an indication that the second entity identifier is associated with the search results of the second set of search results that are not of the first set of search results and that are being omitted.

17. The system of claim 16, wherein the instructions further comprise instructions to:
provide the modified search results in response to the selection of the first search result.

18. The system of claim 16, wherein the instructions to modify the initial search results further include instructions to:
maintain only search results of the first set of search results in the modified search results.

19. A non-transitory computer readable storage medium storing computer instructions executable by a processor to perform a method comprising:
providing initial search results that are responsive to a search query, the initial search results including a first set of search results that are each associated with a first entity and a second set of search results that are each associated with a second entity;
wherein the first entity is distinct from the second entity; and
wherein the first set of search results include one or more search results that are distinct from one or more of the search results of the second set of search results;
determining a selection of a first search result of the first set of search results, the selection of the first search result indicative of retrieval of a first document linked to by the first search result; and
modifying, based on the selection of the first search result, the initial search results to create modified search results, wherein modifying the initial search results includes maintaining multiple search results of the first set of search results and omitting the search results of the second set of search results that are not of the first set of search results, and
providing, in response to the selection of the first search result, a search result summary for display with the modified search results, wherein the search result summary comprises:
an omitted search results indication, the omitted search results indication indicating that the search results of the second set of search results that are not of the first set of search results are being omitted,
a second entity identifier that identifies the second entity, and
an indication that the second entity identifier is associated with the search results of the second set of search results that are not of the first set of search results and that are being omitted.

* * * * *